United States Patent
Asayama et al.

(10) Patent No.: US 10,016,639 B2
(45) Date of Patent: Jul. 10, 2018

(54) FIRE EXTINGUISHING AGENT DISCHARGE APPARATUS

(71) Applicants: Iluka College Co., Ltd., Yonago-shi, Tottori (JP); NATIONAL UNIVERSITY CORPORATION TOTTORI UNIVERSITY, Tottori-shi, Tottori (JP)

(72) Inventors: Noriko Asayama, Tottori (JP); Yuhei Matsubara, Tottori (JP)

(73) Assignees: ILUKA COLLEGE CO., LTD., Tottori (JP); NATIONAL UNIVERSITY CORPORATION TOTTORI UNIVERSITY, Tottori (JP)

( * ) Notice: Subject to any disclaimer, the term of this patent is extended or adjusted under 35 U.S.C. 154(b) by 73 days.

(21) Appl. No.: 15/122,057

(22) PCT Filed: Feb. 25, 2015

(86) PCT No.: PCT/JP2015/055477
§ 371 (c)(1),
(2) Date: Aug. 26, 2016

(87) PCT Pub. No.: WO2015/129767
PCT Pub. Date: Sep. 3, 2015

(65) Prior Publication Data
US 2017/0216638 A1 Aug. 3, 2017

(30) Foreign Application Priority Data
Feb. 28, 2014 (JP) ................................. 2014-039711

(51) Int. Cl.
*A62C 2/00* (2006.01)
*A62C 3/02* (2006.01)
(Continued)

(52) U.S. Cl.
CPC ............ *A62C 3/025* (2013.01); *A62C 3/0228* (2013.01); *A62C 3/0235* (2013.01); *A62C 5/002* (2013.01);
(Continued)

(58) Field of Classification Search
CPC ..... A62C 3/0228; A62C 3/0235; A62C 8/005; A62C 3/025; A62C 5/002; A62C 5/033; B64D 1/16; B64C 27/06
(Continued)

(56) References Cited

U.S. PATENT DOCUMENTS 7,717,187 B1 * 5/2010 Miller ...................... A62C 2/10
169/46
7,992,647 B2 * 8/2011 Cordani ................. B64D 25/00
169/30
(Continued)

FOREIGN PATENT DOCUMENTS

JP 64-5569 A 1/1989
JP 10-147919 A 6/1998
(Continued)

OTHER PUBLICATIONS

International Search Report, dated May 19, 2015, International Application No. PCT/JP2015/055477 (2 pages).

*Primary Examiner* — Steven J Ganey
(74) *Attorney, Agent, or Firm* — Hamre, Schumann, Mueller & Larson, P.C.

(57) ABSTRACT

Provided is a dropping-type fire extinguishing body that, in fire extinguishing using a gel-like fire extinguishing agent, can allow the fire extinguishing agent to be smoothly conveyed and dropped.
A dropping-type fire extinguishing body 1 to be dropped onto the fire site to extinguish the fire, wherein a gelling agent 3 is contained in a bag body 2 formed of a water-
(Continued)

permeable material and water is permeated into the body and is mixed with the gelling agent to prepare a gel-like fire extinguishing agent, thereby filling the gel-like fire extinguishing agent into the inside of the bag body.

19 Claims, 14 Drawing Sheets

(51) Int. Cl.
    *A62C 5/033*      (2006.01)
    *A62C 5/00*      (2006.01)
    *B64D 1/16*      (2006.01)
    *B64C 27/06*      (2006.01)
    *A62C 8/00*      (2006.01)

(52) U.S. Cl.
    CPC .............. *A62C 5/033* (2013.01); *A62C 8/005* (2013.01); *B64C 27/06* (2013.01); *B64D 1/16* (2013.01)

(58) Field of Classification Search
USPC ..... 169/46, 47, 34–36, 30, 52, 53, 70; 252/2
See application file for complete search history.

(56) References Cited

U.S. PATENT DOCUMENTS

| | | | |
|---|---|---|---|
| 8,746,355 B2 * | 6/2014 | Demmitt | A62C 3/025 169/35 |
| 2007/0007021 A1 * | 1/2007 | Regan | A62C 3/025 102/211 |

FOREIGN PATENT DOCUMENTS

| | | |
|---|---|---|
| JP | 2011-167357 A | 9/2011 |
| JP | 2014-217483 A | 11/2014 |
| WO | 2010/083890 | 7/2010 |

* cited by examiner

FIRE EXTINGUISHING AGENT DISCHARGE APPARATUS

TECHNICAL FIELD

The present invention relates to a fire extinguishing agent discharge apparatus and particularly to a fire extinguishing agent discharge apparatus suitably used for the discharge of a gelled fire extinguishing agent.

BACKGROUND ART

Water is generally used as a fire extinguishing agent in fire extinguishing, and the water is discharged from a fire extinguishing vehicle towards a fire origin to lower the temperature of the fire origin or to reduce the amount of oxygen around the fire origin (that is, to perform smothering extinguishment).

Under such a situation that a fire extinguishing vehicle cannot approach a fire origin, for example, at the time of disaster or mountain fire, effective fire extinguishing work cannot be carried out from the ground.

To cope with this situation, a method of spraying water from above the fire origin using a helicopter or an aircraft on a water ship, is adopted.

In spraying water using the aircraft, a certain altitude should be kept from the viewpoint of ensuring safety of the aircraft against heat in the fire origin and an ascending air current.

However, water applied from the aircraft, when the distance from the fire origin is larger, is likely to be scattered in a wider area by an influence of an external force. Thus, water cannot be easily concentrated to the fire origin, and, further, is scattered as mist before the water arrives at the fire origin, making it impossible to effectively extinguish the fire.

In order to overcome this problem, a technique has been proposed in which the fire extinguishing agent is dropped in a gel form to reduce a scattering area of the fire extinguishing agent and to apply the whole amount of the used fire extinguishing agent for fire extinguishing (see Patent Literature 1).

CITATION LIST

Patent Literature

Patent Literature 1: JP2011-167357A

SUMMARY OF INVENTION

Technical Problem

Even in the above described prior art, however, the following problem remains unsolved.

Specifically, the gel-like fire extinguishing agent, when brought into a fire extinguishing site, need to be conveyed while being stored in a container and, in fire extinguishing, is dropped from the container towards a fire origin. Thus, from the viewpoint of carrying out rapid fire extinguishing work, it is necessary to obtain rapid gelation of the fire extinguishing agent and dropping operation and an effective dropping and spraying field.

In view of the above problem, the present invention has been made, and an object of the present invention is to provide a dropping-type fire extinguishing body and a dropping control apparatus that, in fire extinguishing work using a gel-like fire extinguishing agent, can control and effectively conduct the production and dropping of the fire extinguishing agent.

Solution to Problem

According to the present invention, provided is a dropping-type fire extinguishing body to be dropped on a fire site for extinguishing the fire, wherein the dropping-type fire extinguishing body comprises: a bag body formed of a water-permeable material which stores a gel-like fire extinguishing agent, and the gel-like fire extinguishing agent is produced by introducing the bag body in the fire extinguishing agent tank and allowing water to be absorbed in a gelling agent stored in the bag body, whereby the inside of the bag body is filled with the water-absorbed fire extinguishing agent.

With such a configuration, mere permeation of water into the bag body can allow a gel-like fire extinguishing agent to be produced and the surface of the gel-like fire extinguishing agent to be covered with the bag body. Thus, a dropping-type fire extinguishing body having a uniformly held outer shape can be obtained.

The dropping-type fire extinguishing body is used, for example, in such a manner that the dropping-type fire extinguishing body is produced immediately before fire extinguishing work and is conveyed by a ladder truck to a position above a fire site, or that the fire extinguishing body is formed in a period between the loading in a dropping-type fire extinguishing body dropping apparatus loaded in an aircraft and the convey of the dropping-type fire extinguishing body dropping apparatus to the fire site, followed by dropping the dropping-type fire extinguishing body from above the fire site towards a fire origin.

Here the dropping-type fire extinguishing body is in such a form that a gel-like fire extinguishing agent is filled within the bag body. Thus, scattering of the fire extinguishing agent is prevented, and the dropping point of the dropping-type fire extinguishing body can easily be predicted with a high accuracy from the surface area and weight of the dropping-type fire extinguishing body (bag body) and the height of the dropping position. Further, the prediction is calculated by a control system to obtain dropping timing, and the dropping-type fire extinguishing body is dropped on the fire origin with a high probability.

When the dropping-type fire extinguishing body approaches a fire origin, the bag body is melted by the heat, or the bag body is ruptured by impact applied at the time of dropping, whereby the gel-like fire extinguishing agent inside the bag is scattered for fire extinguishing.

Accordingly, the gel-like fire extinguishing agent can be reliably allowed to act on the fire origin to effectively extinguish the fire, and, at the same time, fire extinguishing from a higher position is possible to enhance the safety of the fire extinguishing work.

On the other hand, the dropping-type fire extinguishing body can be stored in a dry state, and, further, the shape thereof is held by the bag body. Thus, the dropping-type fire extinguishing body is easy to handle. For example, work for loading on the water poured dropping-type fire extinguishing body dropping apparatus becomes simple, and the production and conveying of the gel-like fire extinguishing agent and the operation of dropping of the fire extinguishing agent on the fire origin can be carried out by a series of operations, contributing to simple works. As a result, rapid fire extinguishing work can be achieved.

When the bag body is formed of a low impact resistant material or a material that can easily be melted by heat, the bag body can easily be removed after dropping on the fire origin, contributing to rapid scattering of the gel-like fire extinguishing agent at the fire origin and making it possible to satisfactorily exert fire extinguishing properties.

In a preferred embodiment of the present invention, the material of the bag body contains polylactic acid.

When polylactic acid is used as a main material for the bag body, a highly biodegradable bag body can be formed.

In a preferred embodiment of the present invention, the content of polylactic acid is not less than 80% by mass.

When polylactic acid is contained in the sufficiently content range, the occurrence of cramping in the bag body can be suppressed and the strength, when the bag body is immersed in water, can be sufficiently kept.

In a preferred embodiment of the present invention, the basis weight of the polylactic acid is 10 to 30 g/m$^2$.

When the basis weight is in the above described range, the water permeability of the bag body is enhanced and a tensile strength suitable for the dropping-type fire extinguishing body can be sufficiently kept.

Further, the bag body further contains surfactant agent depending upon the size, type and place of the fire.

When the bag body contains a surfactant, the amount of supplied water in the dropping-type fire extinguishing body can be increased.

Furthermore, in a preferred embodiment of the present invention, it is characterized that when water is permeated into the bag body to obtain the gel-like extinguishing agent, the bag body has an outer shape of a triangular pyramid shape or a cubic shape.

When the bag body is formed in a triangular pyramid shape or a cubic shape, the bag body can be mechanically manufactured more easily.

Furthermore, in a preferred embodiment of the present invention, the gelling agent is an edible gelling agent selected from gelatin, carrageenan, agar, and polysaccharides.

When the edible gelling agent is adopted, there is no influence of the reside on the environment after the fire extinguishing work and a fire extinguishing agent that is environmentally friendly can be realized.

On the other hand, the dropping-type fire extinguishing body dropping apparatus is loaded on an aircraft, and the gelling agent is mixed with water within the dropping-type fire extinguishing body dropping apparatus loaded on the aircraft during movement of the aircraft to a fire site to form the dropping-type fire extinguishing body. When the aircraft arrives at a position above the fire site, the packed dropping-type fire extinguishing body may be dropped on a fire by the dropping-type fire extinguishing body dropping apparatus.

According to this method, when the production of the dropping-type fire extinguishing body and the filling of the dropping-type fire extinguishing body into the dropping-type fire extinguishing body dropping apparatus are carried out within the dropping apparatus loaded on the aircraft during the movement to a fire site, the time required from a call for service to the start of fire extinguishing work can be shortened.

Further, in the dropping-type fire extinguishing body, mere permeation of water into the bag body can allow a gel-like fire extinguishing gent to be produced. Thus, there is no need to perform stirring operating for mixing of the liquid with the gelling agent within the aircraft, contributing to an enhancement in safety during the flight.

As a method of loading the dropping fire extinguishing body in the dropping-type fire extinguishing body dropping apparatus, a method in which a bag body containing a gelling agent is loaded on the fire extinguishing body dropping apparatus filled with fire extinguishing water in such a manner that the dry dropping-type fire extinguishing body is loaded or a method in which the dry dropping-type fire extinguishing body is preloaded on the dropping-type fire extinguishing body dropping apparatus followed by filling of water into the dropping-type fire extinguishing body dropping apparatus to produce the dropping-type fire extinguishing body within the dropping-type fire extinguishing body dropping apparatus can be considered as a method for loading of the dropping-type fire extinguishing body into the dropping-type fire extinguishing body dropping apparatus. Alternatively, a method may be adopted in which the dropping-type fire extinguishing body is produced outside the dropping-type fire extinguishing body dropping apparatus and the produced dropping-type fire extinguishing body is manually loaded within the dropping-type fire extinguishing body dropping apparatus.

When the fire extinguishing work is continuously carried out, after the dropping-type fire extinguishing body is once dropped, water and a dropping-type fire extinguishing body are again loaded on the dropping-type fire extinguishing body dropping apparatus.

Here water only, or a mixture of water and a fire extinguishing assistant may be used as a main agent of the gel-like fire extinguishing agent.

On the other hand, a method may also be adopted in which a dropping-type fire extinguishing body dropping apparatus on which the dropping-type fire extinguishing body is loaded is previously provided and, at the time of the call for service of the fire extinguishing work, the dropping-type fire extinguishing body dropping apparatus is loaded on an aircraft.

Advantageous Effects of Invention

According to the present invention, in a fire extinguishing work using a gel-like fire extinguishing agent, the fire extinguishing agent before the dropping on a fire origin has a stable shape and thus is easy to handle, and, at the same time, the convey of the fire extinguishing agent and the operation of dropping to a fire origin can be consolidated as a series of operations and smooth operations can be realized, contributing to rapid fire extinguishing work.

DESCRIPTION OF EMBODIMENTS

One embodiment of the present invention will be described with reference to the accompanying drawings.

Figure 1:
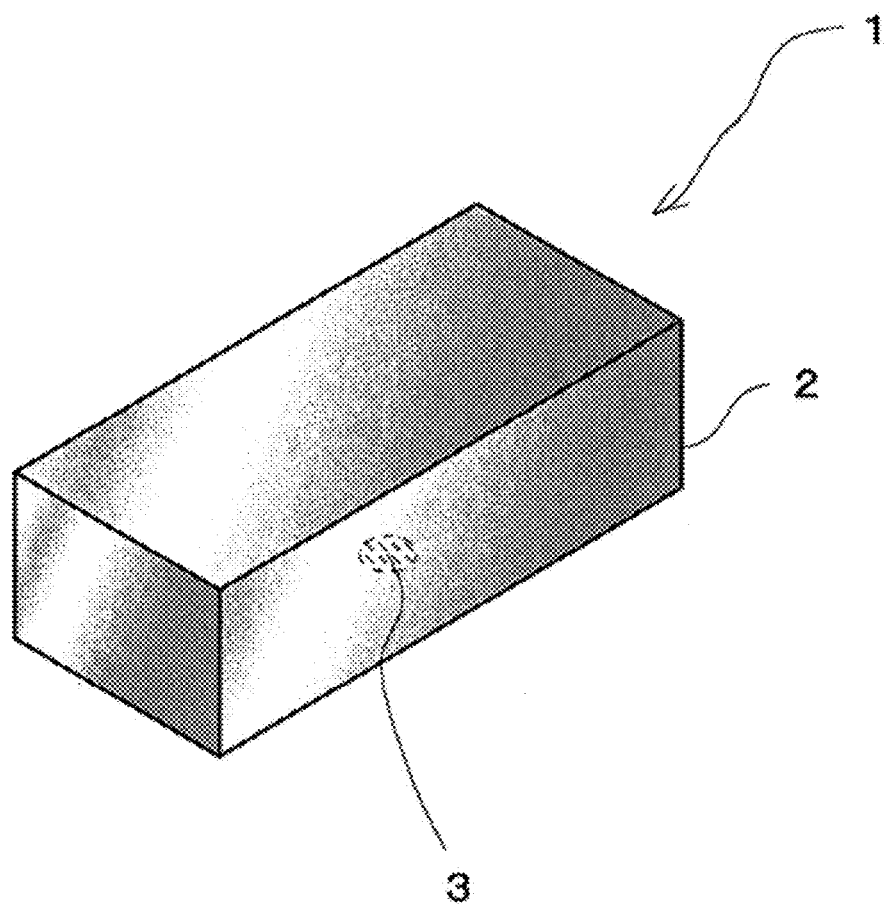
FIG. 1 is a perspective view illustrating a dropping-type fire extinguishing body in one embodiment of the present invention.

In FIG. 1, numeral 1 designates a dropping-type fire extinguishing body according to an embodiment of the present invention. The dropping-type fire extinguishing body has such a configuration that a gelling agent 3 is contained in a bag body 2 formed of a water permeable material and water is permeated into the bag body and is mixed with the gelling agent to prepare a gel-like fire extinguishing agent, whereby the gel-like fire extinguishing agent is filled into the inside of the bag body 2.

Preferably, the bag body 2 is formed of a material that has low impact resistant and is easily melted by heat.

This is to ensure that, when the dropping-type fire extinguishing body 1 is dropped on a fire origin, the bag body 2 is easily broken by the dropping impact and the dropping-type fire extinguishing body 1 is easily melted by the heat of the fire origin, whereby the gel-like fire extinguishing agent within the bag body 2 is rapidly impacted.

Further, in order to prevent scattering of the gelling agent 3 stored in the bag body 2, the bag body 2 is formed of a material that has micropores having a smaller size than the particle diameter of the gelling agent 3.

Examples of specific materials that meet such various conditions include paper, or nonwoven fabrics such as kenafs, wood pulps, regenerated PETs, polypropylenes, polyethylenes, polyesters, or mixed materials thereof.

Among them, polylactic acids that are polyesters are biodegradable and can easily be bonded by thermocompression bonding or ultrasonic bonding, and the bonded sites are easily broken by impact applied at the time of dropping. Thus, the polylactic acids are suitable as the material for the bag body 2.

The polylactic acid is hardly decomposed under ordinary room-temperature environment and can be used for a long period of time. The polylactic acid, however, is biodegradable. Specifically, when the polylactic acid is placed under an environment having a proper water content and temperature, in compost or soil, for example, hydrolysis proceeds and, thereafter, decomposition by microorganisms proceeds. Finally, the polylactic acid is completely decomposed into $CO_2$ and water. Accordingly, the polylactic acid does not adversely affect the environment after the fire extinguishing work.

When the polylactic acid is subjected to papermaking, mixing of pulps can be considered. When the pulp is mixed in an amount of not less than 20%, it causes cramping as well as a lowering in strength when the bag body is immersed in water. Accordingly, the content of the polylactic acid in papermaking is preferably in the range of 80 to 100% by mass, more preferably, in the range of 90 to 100% by mass.

The basis weight that exerts water permeability of the polylactic acid is in the range of 10 to 30 $g/m^2$, more preferably in the range of 15 to 20 $g/m^2$. When the basis weight is increased, the thickness is large and the water permeability is likely to be inhibited and the cost is disadvantageously increased.

A method for the formation of nonwoven fabrics used in bag bodies includes a dry method and a wet method. The retention of the strength of the bag body 2 formed of the polylactic acid formed by the dry method is better than that of the bag body 2 formed of the polylactic acid formed by the wet method. The bag body 2 formed by the wet method may also be used. However, when, for example, the retention of the shape for one day or longer after immersion in water is required, the bag body 2 formed by the dry method that can easily retain the strength is preferably used.

On the other hand, any gelling agent may be used without particular limitation as the gelling agent 3 as long as the gelling agent can cause gelation of water and does not sacrifice a fire extinguishing capability.

Gelling agents which have viscoelasticity high enough to form a mass and form a gel within 10 min, preferably within 5 min, regardless of the water temperature are preferably used.

Examples of gelling agents include naturally occurring gelling agents such as agars, carageenans, gelatins, pectins, guar gums, and xanthan gums, and polymeric absorbing materials.

Starch-based polymeric absorbing materials, cellulose-based polymeric absorbing materials, polysaccharides, polyvinyl-based polymeric absorbing materials, and acrylic acid-based polymeric absorbing materials may be used as the polymeric absorbing material.

The gelling agent is preferably particulate or powdery.

Among others, using edible gelling agents that, even when animals eat residues, are harmless allows to obtain fire extinguishing agents that are harmless to a natural environment. In particular, gelatins, carageenans and other naturally occurring polysaccharides have a large water supplying capability and can realize a high water supply speed and thus are preferably used as gelling agents for the dropping-type fire extinguishing body.

Gel-like fire extinguishing agents produced by mixing these gelling agents 3 with water undergo a change in weight when the amount of water absorbed by the gelling agent 3 increases with the elapse of time after the mixing. The degree of a change in weight of the dropping-type fire extinguishing body is shown in Table 1. The initial weight of samples 1 to 4 that are dropping-type fire extinguishing bodies is 1.1 g, and the samples formed of 0.2 g of a bag body 2 and 0.9 g of a gelling agent 3. Further, in the sample 1 and the sample 2, a polylactic acid formed by a wet method is used as the bag body 2, and, in the sample 3 and the sample 4, a polylactic acid formed by a dry method is used as the bag body 2.

TABLE 1

| Paper | After 1 min (g) | After 3 min (g) | After 5 min (g) | After 30 min (g) | After 60 min (g) |
|---|---|---|---|---|---|
| Sample 1 (wet type) | 74.8 | 86.9 | 88.9 | 97.2 | 98.1 |
| Sample 2 (wet type) | 71.8 | 82.4 | 82.9 | 89.1 | 92.8 |
| Sample 3 (dry type) | 70.0 | 86.2 | 88.9 | 91.8 | 94.8 |
| Sample 4 (dry type) | 70.8 | 81.2 | 84.9 | 95.1 | 96.9 |

The gel-like fire extinguishing agent produced as described above, together with the bag body 2, constitutes the dropping-type fire extinguishing body 1. When the impact power applied in dropping the dropping-type fire extinguishing body 1 is large, for example when a building is included in the fire origin, breaking of the building by the dropping-derived impact power of the dropping-type fire extinguishing body 1 is expected.

In order to suppress this phenomenon, the weight of the dropping-type fire extinguishing body 1 is preferably 100 g to 200 g. Accordingly, the amount of the gelling agent 3 is set from the maximum water absorption amount of the gelling agent 3, and the gelling agent 3 in this setting amount is filled into the bag body 2.

In Table 1, when the amount of the gelling agent 3 is set to 0.9 g, about 100 g of a dropping-type fire extinguishing body 1 can be obtained by absorption and filling of water into the gel-like fire extinguishing agent. Accordingly, it has been found that, when the preparation of about 100 g of a fire extinguishing agent is contemplated, a suitable dropping-type fire extinguishing body 1 can be obtained by dissolving the gelling agent 3 in water at a concentration of about 1% by mass of the weight of the dropping-type fire extinguishing body 1. Further, the results in Table 1 reveal that there is no difference in water absorption between the polylactic acid formed by the wet method and the polylactic acid formed by the dry method.

In order to increase the amount of water supplied into the bag body 2, a surfactant may be mixed into the bag body 2.

Nonionic surfactants, amphoteric surfactants, and anionic surfactants may be used as surfactants. In particular, surfactants produced from coconut oils or polysaccharides are preferred because the environmental load at a dropping point is low.

Figure 18:
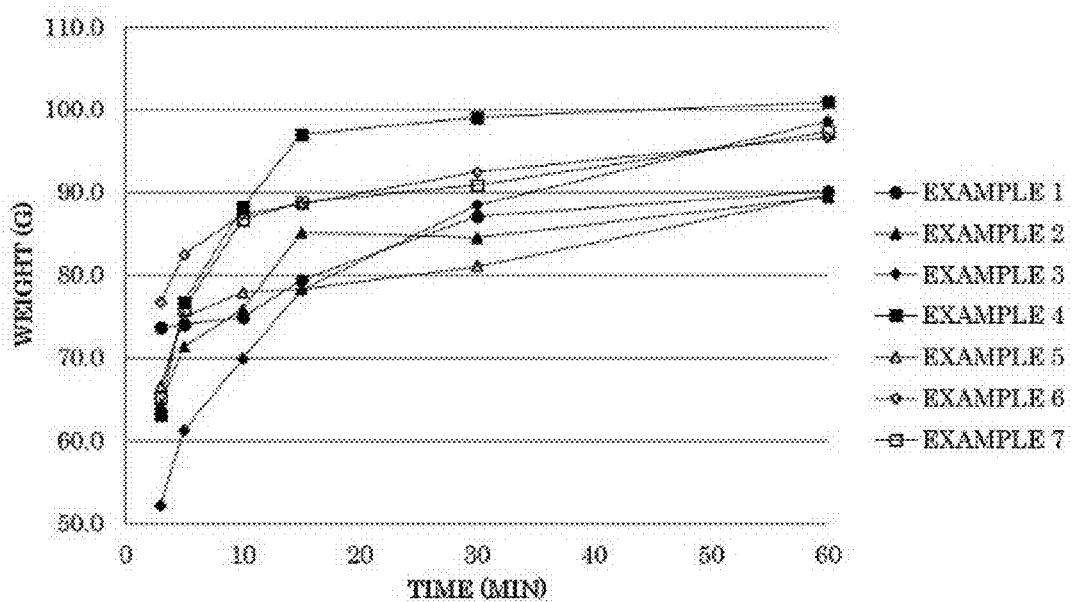
FIG. 18 is a graph illustrating a change in weight of a dropping-type fire extinguishing body when water has been permeated into a bag body containing a surfactant.

FIG. 18 is a graph illustrating a change in weight of the dropping-type fire extinguishing body 1 with the elapse of time when water is permeated into the dropping-type fire extinguishing body 1, for a case where the dropping-type fire extinguishing body 1 contains a surfactant and a case where the dropping-type fire extinguishing body 1 is surfactant free. Table 2 shows the amount of a polysaccharide-based gelling agent (WA-702) contained in the bag body 2 in Examples 1 to 7 illustrated in FIG. 18 and the amount of a surfactant respectively. The surfactant used at that time is Joribu (registered trademark), and values illustrated in FIG. 18 are average values in the number of tested samples.

TABLE 2

| | Example 1 | Example 2 | Example 3 | Example 4 | Example 5 | Example 6 | Example 7 |
|---|---|---|---|---|---|---|---|
| WA702 (g) | 0.7 | 0.7 | 0.7 | 0.7 | 0.8 | 0.8 | 0.8 |
| Surfactant (g) | 0 | 0.1 | 0.2 | 0.3 | 0 | 0.1 | 0.2 |
| Number of tested samples | 2 | 2 | 2 | 2 | 2 | 2 | 2 |

Examples 1 to 4 where 0.7 g of WA-702 was contained will be compared with reference to FIG. 18. As compared with Examples 1 and 2 where 0 g of the surfactant and 0.1 g of the surfactant are contained, respectively, in Examples 3 and 4 where 0.2 g of the surfactant and 0.3 g of the surfactant are contained, respectively, the amount of water supplied into the bag body 2 was increased by about 10 g.

Likewise, comparison of Examples 5 to 7 where 0.8 g of WA-702 was contained reveals that, as compared with Example 5 where the surfactant was not contained, a larger amount of water was supplied in Examples 6 and 7 where 0.1 g of the surfactant and 0.2 g of the surfactant were contained, respectively.

In the dropping-type fire extinguishing body 1 according to an embodiment of the present invention as described above, an aircraft equipped with an dropping-type fire extinguishing body dropping apparatus containing a number of dropping-type fire extinguishing bodies 1 of this type is located above a fire site, and the dropping-type fire extinguishing bodies 1 are dropped on the fire site by the dropping apparatus. Alternatively, the dropping-type fire extinguishing body dropping apparatus is located above the fire site by a ladder truck, and the dropping-type fire extinguishing bodies 1 are dropped on the fire site by the dropping apparatus.

As described above, the dropping-type fire extinguishing body 1 is produced by immersing a bag body 2 containing the gelling agent 3 in water. Alternatively, other methods usable include a method in which the dropping-type fire extinguishing body 1 is previously produced, the produced dropping-type fire extinguishing body 1 is loaded on the dropping-type fire extinguishing body dropping apparatus and, together with the dropping-type fire extinguishing body dropping apparatus, is conveyed by an aircraft to a position above a fire site, a method in which a number of bag bodies 2 containing the gelling agent 3 are previously loaded on the dropping-type fire extinguishing body dropping apparatus, and, in conveying the dropping-type fire extinguishing body dropping apparatus to a position above a fire site, water is filled into the dropping-type fire extinguishing body dropping apparatus to immerse the bag body 2 in water to produce the dropping-type fire extinguishing body 1, or a method in which a bag body 2 containing the gelling agent is introduced into the dropping-type fire extinguishing body dropping apparatus into which fire extinguishing water was previously filled.

On the other hand, when fire extinguishing work may be carried out with an aircraft, the dropping-type fire extinguishing body dropping apparatus is loaded on the aircraft.

Figure 2:
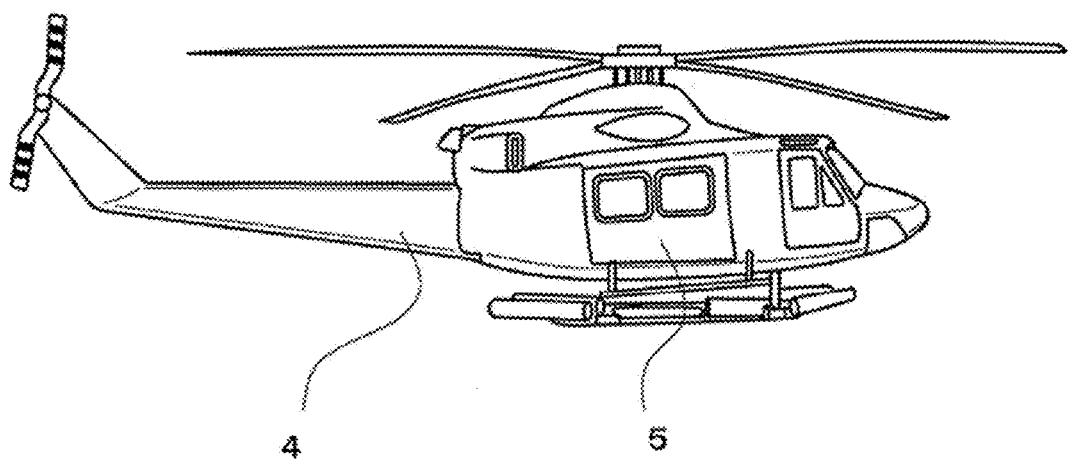
FIG. 2 is aside view of a helicopter to which one embodiment of the present invention has been applied.

FIG. 2 illustrates a helicopter 4 as an aircraft for use in the above-described aerial fire extinguishing. A slide-type door 5 is provided on both sides (only one door is shown in the drawing).

Figure 3:
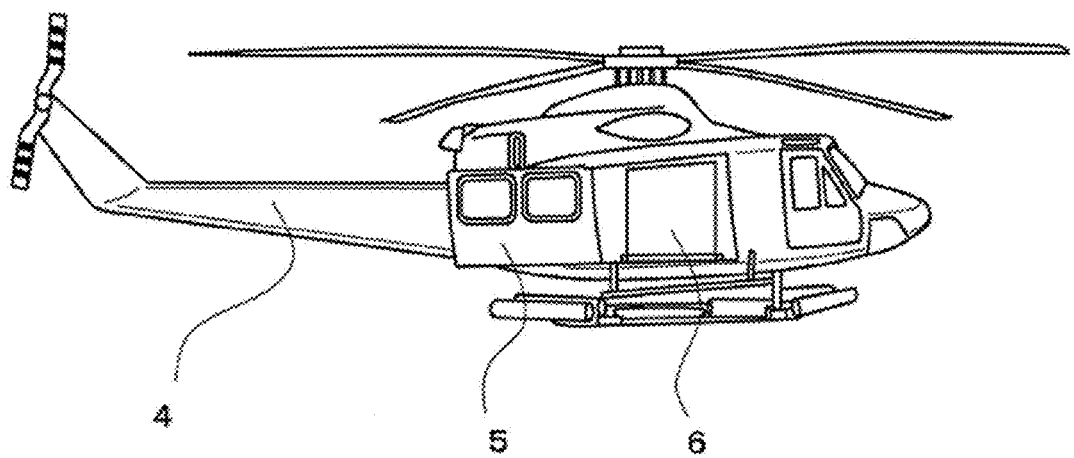
FIG. 3 is aside view of a helicopter to which one embodiment of the present invention has been applied.

As illustrated in FIG. 3, a dropping-type fire extinguishing body dropping apparatus 6 in an embodiment of the present invention is loaded on an inner side of the door 5 within the helicopter 4.

Figure 4:
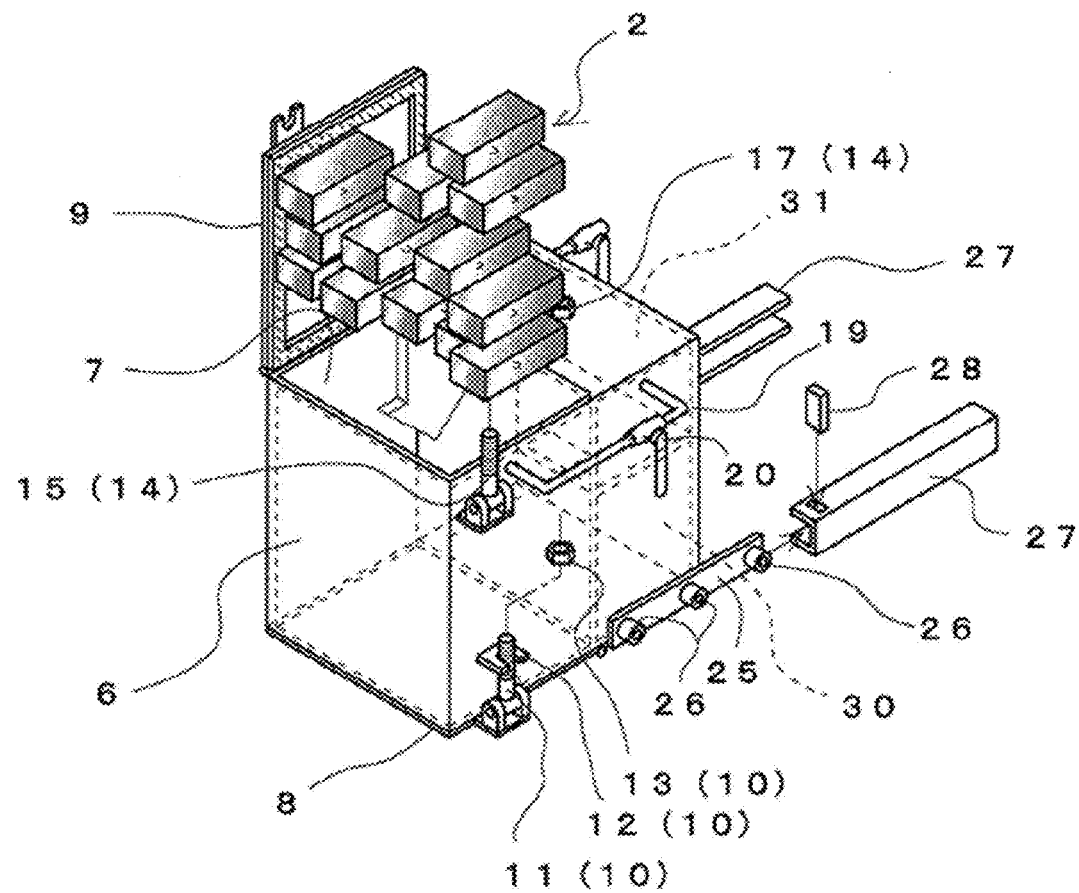
FIG. 4 is an exploded perspective view of a dropping-type fire extinguishing body dropping apparatus which is one embodiment of the present invention.

More specifically, as illustrated in FIG. 4, the dropping-type fire extinguishing body dropping apparatus 6 is formed in a hollow rectangular parallelopiped shape and includes a fire extinguishing agent storage box 7 on which bag bodies 2 not permeated with water are loaded, a water tank 31 that is integrally provided on the side thereof and in which compressed air is stored, and a counter weight 6 that is integrally provided on the side of the box 7 below the water tank 31.

The water tank 31 constitutes a discharge unit that applies a pressure to the fire extinguishing agent Z by the stored compressed air to discharge the fire extinguishing agent Z from the fire extinguishing agent storage box 7.

The fire extinguishing agent storage box 7 has opened upper and lower portions. A bottom plate 8 as an opening/closing member that opens/closes the lower opening is rotatably mounted on the lower portion, and a top plate 9 that opens/closes the upper opening is rotatably mounted on the upper portion.

A first locking unit 10 that fixes the bottom plate 8 to a position that blocks the lower opening is provided between the side edge of the rotatable end of the bottom plate 8 and the side face of the fire extinguishing agent storage box 7.

The first locking unit 10 includes a lock bolt 11 that is mounted on the side edge of the bottom plate 8 and rotatable along a face orthogonal to the face of the bottom plate 8, a locking plate 12 that is provided in a protruded state on the side face of the fire extinguishing agent storage box 7 and, in such a state that the bottom plate 8 is located at the closed position, allows the lock bolt 11 to be fitted thereinto from a direction orthogonal to the side face of the fire extinguishing agent storage box 7 when the lock bolt 11 is rotated, and a lock nut 13 that is threadably mounted on the lock bolt 11 and, in such a state that the lock bolt 11 is located at a position of fitting into the locking plate 12, is brought into press-contact against the locking plate 12 to fix the lock bolt 11 to the locking plate 12.

A second locking unit 14 that fixes the top plate 9 to a position at which the upper opening is blocked is provided between the side edge of the rotatable end of the top plate 9 and the side face of the fire extinguishing agent storage box 7.

The second locking unit 14 includes a lock bolt 15 that is mounted on the side face of the fire extinguishing agent storage box 7 and rotatable along a face orthogonal to the face of the fire extinguishing agent storage box 7, a locking plate 16 that is anchored to the top plate 9 so as to be protruded from the side edge thereof and, in such a state that the top plate 9 is located at the closed portion, allows the lock bolt 15 to be fitted thereinto from a direction orthogonal to the side face of the fire extinguishing agent storage box 7 when the lock bolt 15 is rotated, and a lock nut 17 that is threadably mounted on the lock bolt 15 and, in such a state that the lock bolt 15 is located at a position of fitting into the locking plate 16, is brought into press-contact against the locking plate 16 to fix the lock bolt 15 to the locking plate 16.

A counter weight 30 is mounted on a position below the side of the fire extinguishing agent storage box 7, and a water tank 31 in which water for the production of a gel-like fire extinguishing agent is stored is formed at the upper portion of the counter weight 30.

A water supply pipe 19 that communicates the water tank 31 and the fire extinguishing agent storage box 7 with each other is provided between the water tank 31 and the fire extinguishing agent storage box 7. An opening/closing valve 20 that communicate the water tank 31 and the fire extinguishing agent storage box 7 and blocks that communication between the water tank 31 and the fire extinguishing agent storage box 7 is provided at the halfway of the water supply pipe 19.

On the other hand, a stay 25 is integrally mounted on both sides of the counter weight 30 along the direction of the face of the lower opening of the fire extinguishing agent storage box 7, and a plurality of guide rollers 26 are rotatably mounted at predetermined intervals on these stays 25.

The guide roller 26 is fitted into each of a pair of guide rails 27 provided parallel to a floor face within the helicopter 4 to lock the fire extinguishing agent storage box 7, the water tank 31, and the counter weight 30 to the inside of the helicopter 4.

On the other hand, on each of the guide rails, a stopper 28 that protrudes on a movement locus of the guide roller 26 and restrains the movement of the guide roller 26 to position the fire extinguishing agent storage box 7 is detachably mounted.

The dropping-type fire extinguishing body dropping apparatus 6 according to an embodiment of the present invention thus constructed is stored at a standby state, for example, at a heliport in such a state that a number of bag bodies 2 containing a gelling agent 3 are loaded on the fire extinguishing agent storage box 7.

That is, as illustrated in FIG. 4, in such a state that the bottom plate 8 is fixed at a closed position by the first locking unit 10, a number of bag bodies 2 are loaded from the upper end of the fire extinguishing agent storage box 7, and the top plate 9 is fixed at a closed position.

Further, in such a state that an opening/closing valve 20 is held at a closing position, a predetermined amount of water is filled into the water tank 31.

The above operation allows the dropping-type fire extinguishing body dropping apparatus 6 in an embodiment of the present invention to be brought into a standby state.

Figure 5:
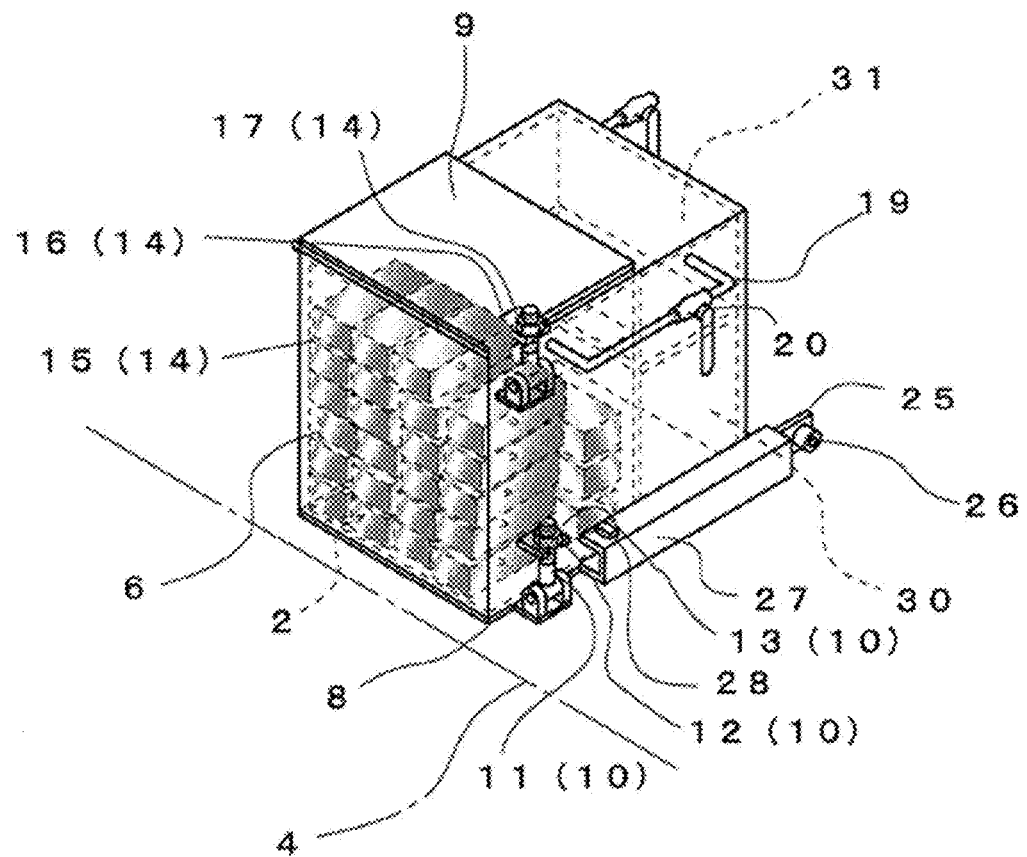
FIG. 5 is a perspective view of a dropping-type fire extinguishing body dropping apparatus which is one embodiment of the present invention.

When fire extinguishing with the helicopter 4 is requested, the dropping-type fire extinguishing body dropping apparatus 6 is loaded on the helicopter 4 as illustrated in FIG. 5 by inserting the guide roller 26 into between the pair of guide rails 27 provided within the helicopter 4 and then mounting a stopper 28 on these guide rails 27 to restrain the movement of the guide roller 26.

At the same time, the opening/closing vale 20 is opened, and water contained in the water tank 31 is fed into the fire extinguishing agent storage box 7 to immerse the box body 2 in water to allow the gelling agent 3 contained in the bag body 2 to absorb water and thus to start the production of a gel-like fire extinguishing agent. In this case, water is supplied in such an amount that, after the production of the dropping-type fire extinguishing body 1, enough water to prevent the occurrence of buoyancy in each of the dropping-type fire extinguishing body 1 stays within the fire extinguishing agent storage box 7. Water needs to be prepared in an amount corresponding to the capability of the gelling agent which allows fire extinguishing water that can be fed into the dropping apparatus to be supplied within 5 to 15 min.

The opening operation of the opening/closing valve 20 is carried out so that the production of the gel-like fire extinguishing agent is completed in a period between the takeoff of the helicopter 4 and the arrival of the aircraft at a position above the fire site.

Upon the arrival of the aircraft at the fire site, the first locking unit 10 in the loaded dropping-type fire extinguishing body dropping apparatus 6 is opened, the dropping-type fire extinguishing body dropping apparatus 6 is pushed out from the door 5 (release fixed) of the aircraft to an outside of the aircraft by a predetermined distance, and the dropping-type fire extinguishing body dropping apparatus 6 is fixed at the pushing out position by the stopper 28.

Figure 6:
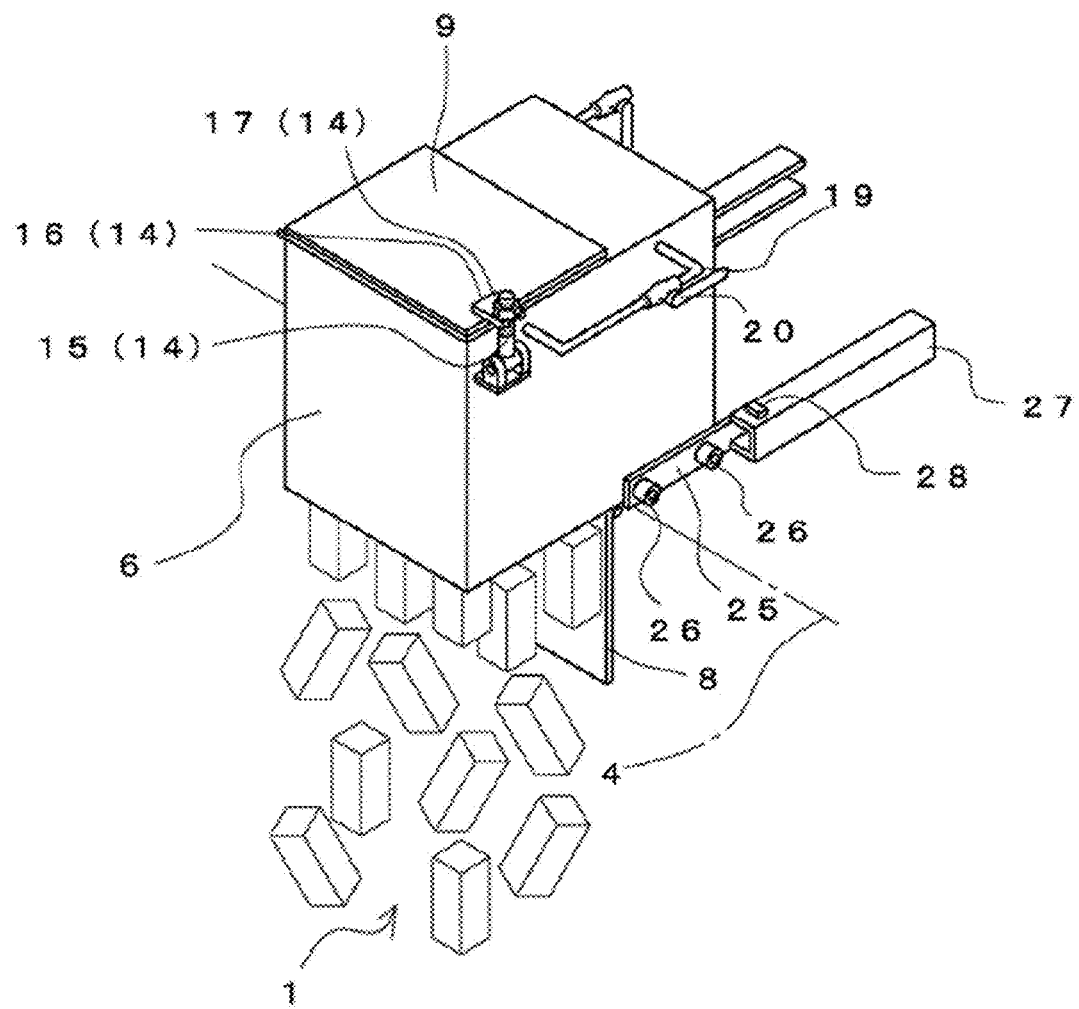
FIG. 6 is a perspective view of a dropping-type fire extinguishing body dropping apparatus which is one embodiment of the present invention.

At this point, locking by the first locking unit 10 is released, and, thus, the bottom plate 8 is rotated downward by its own weight. As a result, the lower portion of the fire extinguishing agent storage box 7 is released as illustrated in FIG. 6.

Thus, the dropping fire extinguishing body 1 loaded on the fire extinguishing agent storage box 7 is dropped by its own weight and dropped towards a fire origin. In this case, even after the production of the dropping-type fire extinguishing body 1, water remains between the dropping-type fire extinguishing bodies 1 and between the dropping-type fire extinguishing bodies 1 and the inner face of the fire extinguishing agent storage box 7, and, thus, the dropping-type fire extinguishing body 1 is less likely to be adhered on the inner face of the fire extinguishing agent storage box 7. Accordingly, as compared with the case where the whole water within the fire extinguishing agent storage box 7 is gelled followed by dropping, the dropping-type fire extinguishing body 1 can be very easily dropped.

Further, in the method in which the whole water within the fire extinguishing agent storage box 7 is gelled followed by dropping, there is a possibility that, after dropping, the gel remains within the fire extinguishing agent storage box 7. In the configuration according to the present invention wherein the dropping-type fire extinguishing body 1 is dropped, the fire extinguishing agent within the fire extinguishing agent storage box 7 can be completely dropped.

The dropped dropping-type fire extinguishing body 1 is dropped in such a state that the shape is covered by the bag body 2. Thus, the dropping-type fire extinguishing body 1 is introduced into the fire origin while maintaining its shape and suppressing melting or evaporation, and, when the fire extinguishing body 1 approaches the fire origin or after the arrival of the fire extinguishing body 1 at the fire origin, the bag is broken and liquefied and the fire extinguishing body 1 is applied as a fire extinguishing agent to fire extinguishing.

Accordingly, the dropping-type fire extinguishing body 1 is charged as a mass, towards the fire origin, thus is less likely to be buffeted by a wind such as a fire wind, and is dropped through a stable trajectory.

As a result, effective dropping on the fire origin is realized, and, at the same time, heat removal or disappearance of oxygen can be carried out at a position close to the fire origin, leading to effective fire extinguishing.

In order to confirm a heat removing effect of the dropping-type fire extinguishing body 1, a thermal analysis was carried out for an endothermic reaction of the gel-like fire extinguishing agent with a differential scanning calorimeter DSC6300 manufactured by Seiko Instruments Inc. The dropping-type fire extinguishing body 1 was heated from room temperature to 1000 degrees Celsius, and the quantity of heat of the gel-like fire extinguishing agent was measured. As a result, it was confirmed that, when the temperature exceeds 100 degrees Celsius, an endothermic reaction occurred by the heat of evaporation of water and, consequently, a heat quantity of about 1932 J/g was absorbed.

Figure 7:
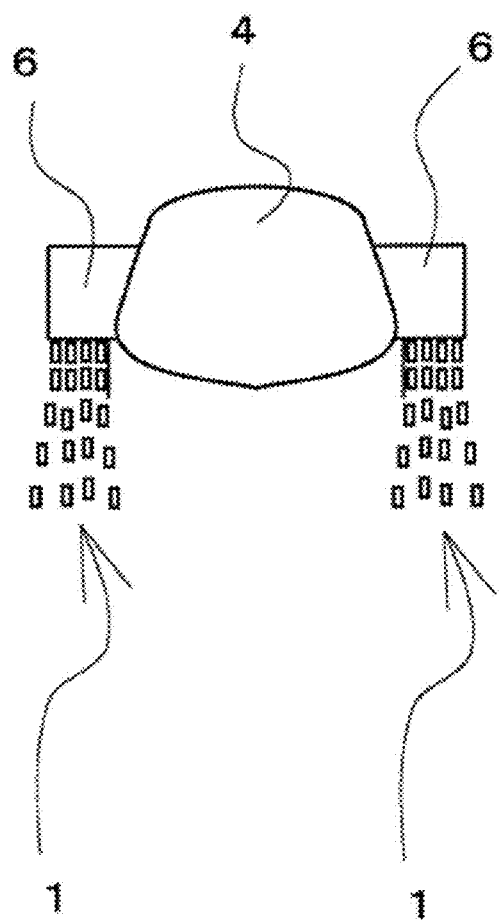
FIG. 7 is a front view of a helicopter to which one embodiment of the present invention has been applied.

In the above-described example, a dropping work of the dropping-type fire extinguishing body 1 on one side face of the helicopter 4 has been described. As illustrated in FIG. 7, the dropping work may be carried out on both side faces of the helicopter 4.

When the dropping work is carried out from both side faces of the helicopter 4 in synchronization, the dropping area of the dropping-type fire extinguishing body 1 can be widened and, at the same time, the weight on the left of the helicopter 4 and the weight on the right of the helicopter 4 can be balanced, contributing to enhanced stability of the posture.

As described above, various works of the production of the gel-like fire extinguishing agent, conveying of the fire extinguishing agent, and the dropping of the fire extinguishing agent on a fire origin can be carried out with one dropping-type fire extinguishing body dropping apparatus 6, and, thus, these works can be smoothly carried out.

By virtue of the high fire extinguishing efficiency of the dropping-type fire extinguishing body 1 including a gel-like fire extinguishing agent having a shape retained by a bag body 2, fire extinguishing at a high altitude with an aircraft can be every effective. At the same time, the safety of the aircraft in fire extinguishing work with the aircraft can be ensured, and rapid response to a fire site that cannot approach from the ground, such as mountain fires and fires at disasters, is possible.

In the above embodiment, an example where the dropping-type fire extinguishing body 1 is produced during movement to a fire site has been described. Alternatively, the dropping-type fire extinguishing body 1 may be produced before the dropping-type fire extinguishing body dropping apparatus 6 is loaded on an aircraft.

Figure 8:
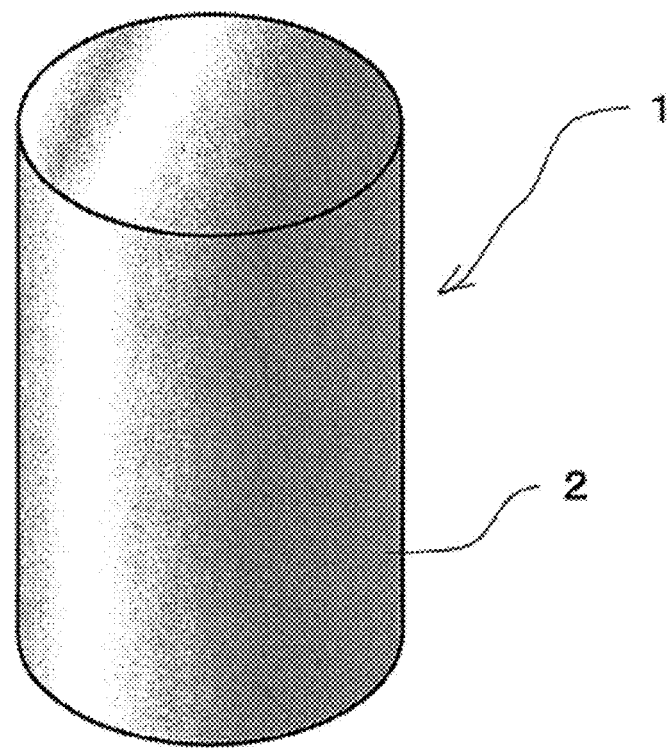
FIG. 8 is a perspective view illustrating a modification example of a dropping-type fire extinguishing body in one embodiment of the present invention.
Figure 9:
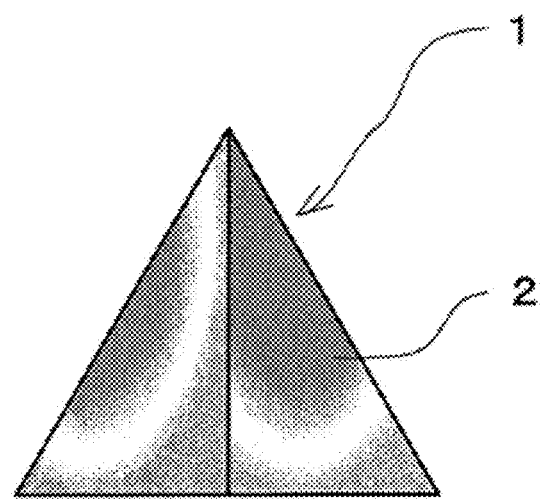
FIG. 9 is a perspective view illustrating a modification example of a dropping-type fire extinguishing body in one embodiment of the present invention.
Figure 10:
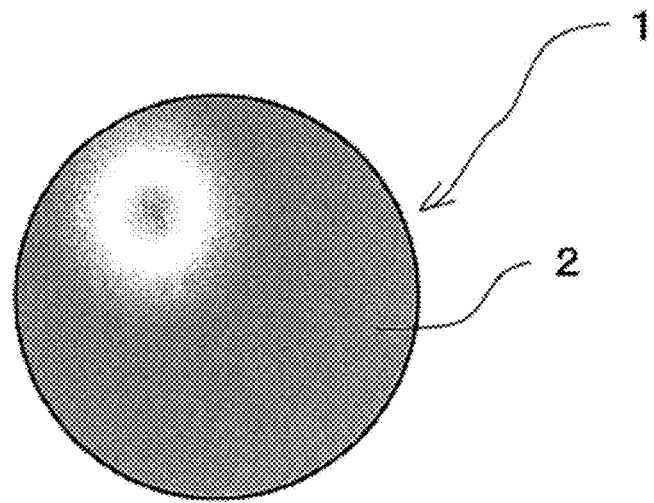
FIG. 10 is a perspective view illustrating a modification example of a dropping-type fire extinguishing body in one embodiment of the present invention.
Figure 11:
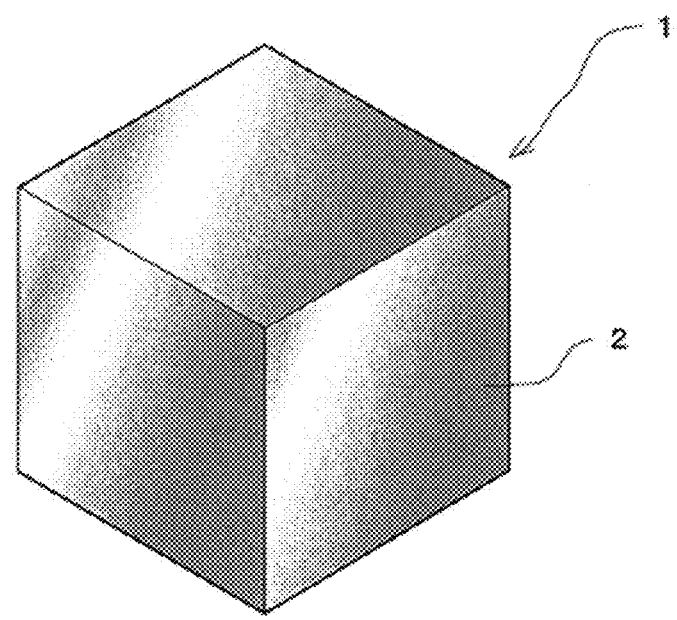
FIG. 11 is a perspective view illustrating a modification example of a dropping-type fire extinguishing body in one embodiment of the present invention.
Figure 12:
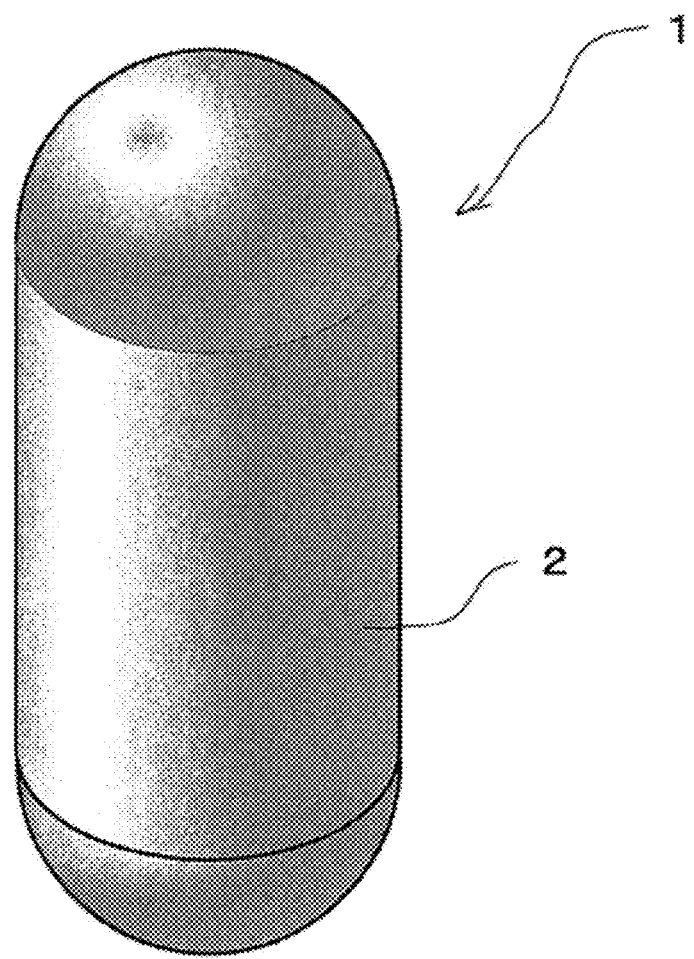
FIG. 12 is a perspective view illustrating a modification example of a dropping-type fire extinguishing body in one embodiment of the present invention.

In the above embodiment, an example where the bag body 2 has a box shape has been described. The bag body 2 may have any shape, and various shapes may be adopted, such as a cylindrical or disk shape shown in FIG. 8, a triangular pyramid shape shown in FIG. 9, a spherical shape shown in FIG. 10, a cubic shape shown in FIG. 11, or a capsule shape shown in FIG. 12.

In particular, a triangular pyramid or cubic bag body 2 is more preferably used because the bag body 2 can be mechanically manufactured in a continuous manner evenly from a roll paper having a constant width and, at the same time, a large amount of the bag body 2 of this shape can be loaded in the dropping-type fire extinguishing body dropping apparatus 6. That is, the triangular pyramid or cubic bag body 2 can be formed by combining regular triangles or squares having an identical shape and thus can easily be manufactured.

Further, when the triangular bag body 2 is formed, a dropping-type fire extinguishing body 1 having a weight of about 100 g that is a preferred weight of the dropping-type fire extinguishing body 1 of the present invention can be obtained by forming a regular triangular pyramid having a length of 8 cm per side.

Further, an example where a number of bag bodies 2 are loaded in the fire extinguishing agent storage box 7 and, at the same time, water is poured into the fire extinguishing agent storage box 7 to produce the dropping-type fire extinguishing body 1 has been described. In this case, there is a possibility that, when a number of dropping-type fire extinguishing bodies 1 are stacked on top of each other, the lower dropping-type fire extinguishing body is collapsed by the weight of the upper dropping-type fire extinguishing body 1. That is, when, after the production of the dropping-type fire extinguishing body 1, residual water exists in an amount large enough to produce buoyance in each of the dropping-type fire extinguishing bodies 1 within the fire extinguishing agent storage box 7, no problem occurs, but on the other hand, when residual water hardly exists, it may be expected that dropping-type fire extinguishing bodies 1 located at lower positions are collapsed. The residual water refers to water that exists between the dropping-type fire extinguishing bodies 1 and between these dropping-type fire extinguishing bodies 1 and the inner face of the fire extinguishing agent storage box 7.

Figure 13:
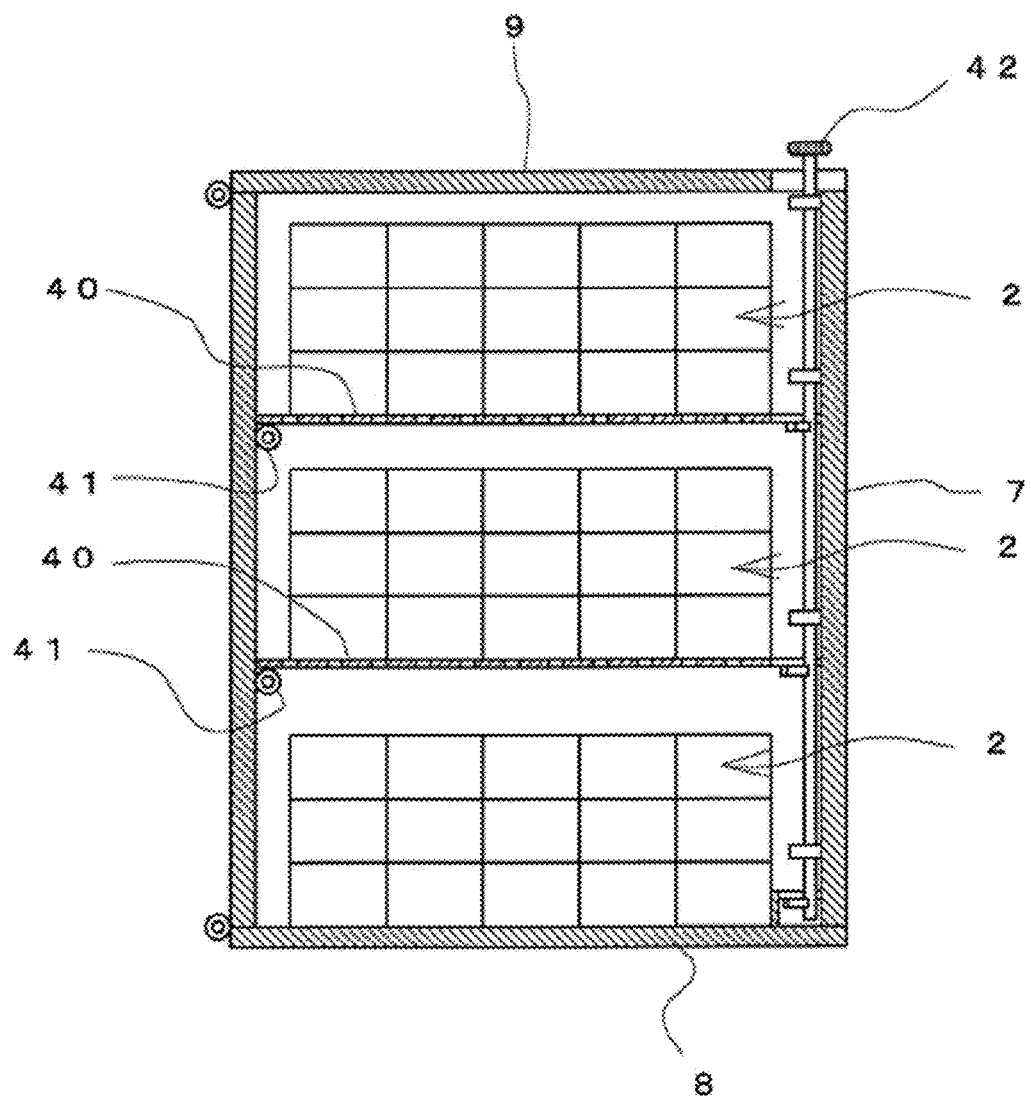
FIG. 13 is a vertical cross-sectional view illustrating a modification example of a fire extinguishing agent storage box according to the present invention.

To prevent this phenomenon, as shown in FIG. 13, a configuration may be adopted in which a plurality of partition walls 40 are provided within the fire extinguishing agent storage box 7 so as to vertically divide the inside of the box 7 into a plurality of portions, each of the partition walls 40 are formed of, for example, punch plates having a number of through-holes, one ends of these punch plates are rotatably connected to the inner wall of the fire extinguishing agent storage box 7 through a hinge 41, and, further, a third locking unit 42 is provided between each of the other end and the inner wall of the fire extinguishing agent storage box 7 so as to be engaged with or disengaged from each of the partition walls 40 and the bottom plate 8, to lock the bottom plate 8 and each of the partition walls 40 at positions that vertically partition the inside of the fire extinguishing agent storage box 7. According to this configuration, the dropping-type fire extinguishing bodies 1 are dispersedly loaded in the partitioned areas.

The third locking unit 42 is configured so that the state of engagement with the bottom plate 8 and each of the partition walls 40 that are in a locked stated are successively released from the lower side by the rotation of the third locking unit 42.

Figure 14:
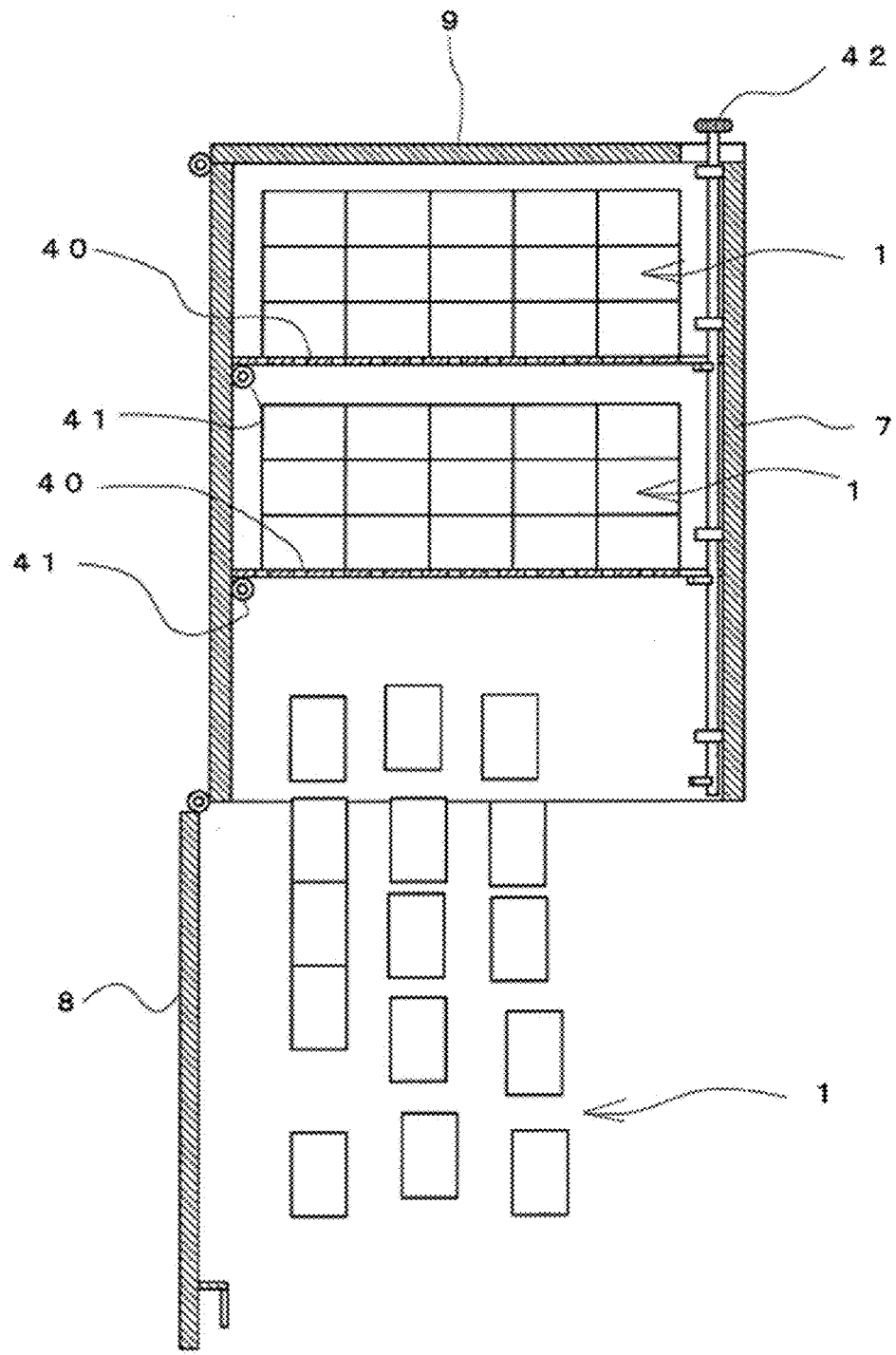
FIG. 14 is a vertical cross-sectional view for the explanation of a function of the fire extinguishing agent storage box illustrated in FIG. 13.
Figure 15:
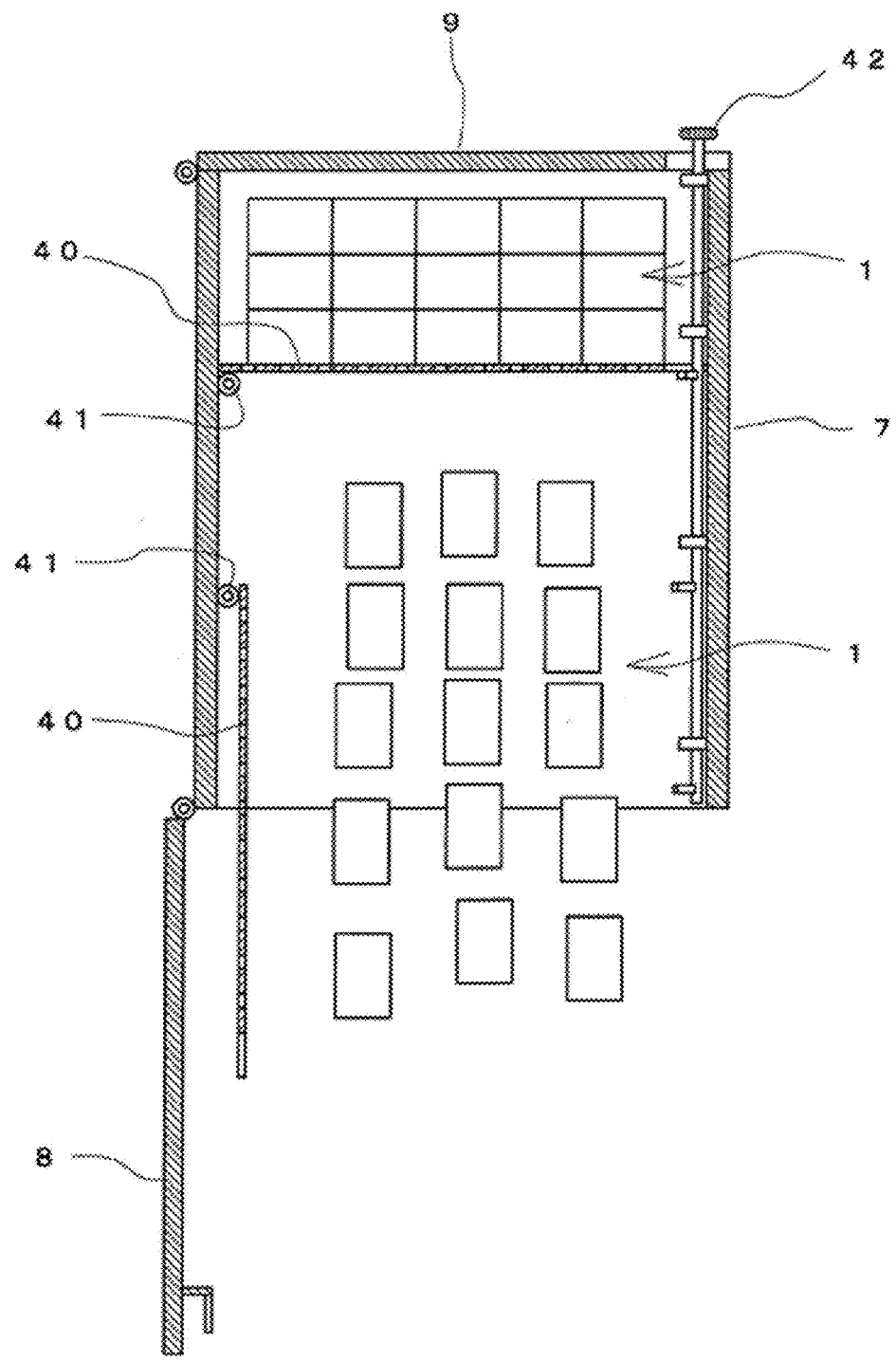
FIG. 15 is a vertical cross-sectional view for the explanation of a function of the fire extinguishing agent storage box illustrated in FIG. 13.

Accordingly, the rotation of the third locking unit 42 allows the bottom plate 8, the lower partition wall 40, and the upper partition wall 40 to be successively rotated by their own weight, and the dropping-type fire extinguishing bodies 1 mounted thereon are successively dropped (see FIGS. 14 and 15).

On the other hand, the bag body 2 is contained in the fire extinguishing agent storage box 7 by rotating each of the partition walls 40 upwardly in such a state that the top plate 9 is opened, first engaging the bottom plate 8 with the third locking unit 42 to lock the bottom plate 8 at a closed position, mounting a plurality of the bag bodies 2 on the bottom plate 8, then rotating the lower partition wall 40 downwardly to engage the lower partition wall 40 with the third locking unit 42 to lock the lower partition wall 40 at the position that partitions the inside of the fire extinguishing agent storage box 7, placing a plurality of the bag bodies 2 thereon, then engaging the upper partition wall 40 with the third locking unit 42 in the same manner as described above in connection with the lower partition wall 40 and then placing the bag bodies 2 thereon.

The fire extinguishing agent storage box 7 can be brought into a standby state by fixing the top plate 9 at the closed position.

Here when water is poured into the fire extinguishing agent storage box 7, the water flows downward into the fire extinguishing agent storage box 7 from the through-holes in the partition wall 40 to fill the inside of the fire extinguishing agent storage box 7 with the water.

When the inside of the fire extinguishing agent storage box 7 is filled with water, water is permeated into each of the bag bodies 2 to produce gel-like fire extinguishing agents and thus to produce dropping-type fire extinguishing bodies 1 and these dropping type fire extinguishing bodies 1 are dispersedly supported by the bottom plate 8 and each of the partition walls 40 for each of a plurality of partitioned areas.

Thus, the load applied to the dropping-type fire extinguishing body 1 located at the lower portion is reduced to prevent collapse or the like.

It is noted that an example where transverse-mounted partition walls 40 formed of a punch plate or the like are provided in two stages has been described. Alternatively, a three- to five-stage configuration may be adopted. In this case, a configuration may be adopted in which the partition wall 40 is taken in and out, for example, by sliding the partition wall 40 in a horizontal or nearly horizontal lateral direction.

Figure 16:
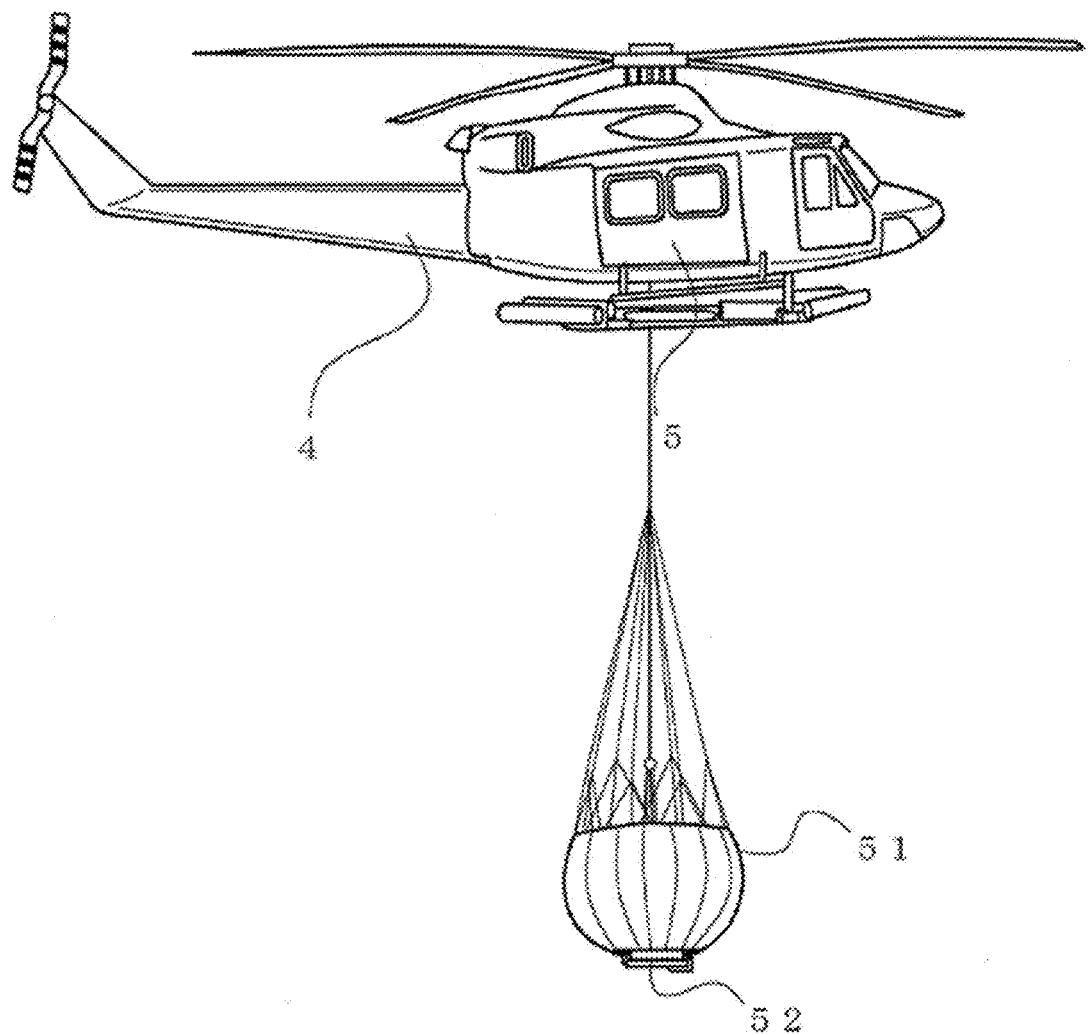
FIG. 16 is a side view illustrating a bucket for aerial fire extinguishing which is one embodiment of the present invention.

Further, as illustrated in FIG. 16, an aerial fire extinguishing bucket 51 that is suspended from the aircraft for fire extinguishing work may be used as the dropping-type fire extinguishing body dropping apparatus 6. The dropping-type fire extinguishing body 1 can be used by merely immersing the dropping-type fire extinguishing body 1 in water contained in the aerial fire extinguishing bucket 51.

A bottom dropping apparatus 52 that allows a valve to be opened in response to a signal may be provided at the bottom of the aerial fire extinguishing bucket 51.

Figure 17:
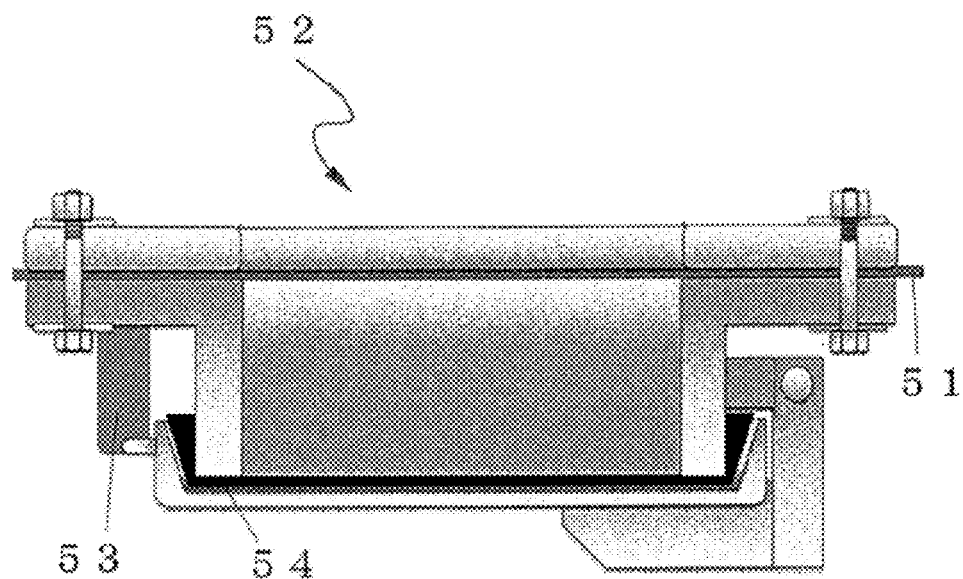
FIG. 17 is a vertical cross-sectional view illustrating a bottom dropping apparatus in a bucket for aerial fire extinguishing which is one embodiment of the present invention.

As illustrated in FIG. 17, the bottom dropping apparatus 52 is provided with a waterproof electric lock 53 and is configured so that the valve is opened manually or in response to a signal from a program.

In an embodiment of the present invention, even when the aerial fire extinguishing bucket 51 is used, a gel-like fire extinguishing agent having an outer shape retained by the bag body can be dropped. Accordingly, the scattering of the gel-like fire extinguishing agent can be prevented, and the gel-like fire extinguishing agent can be dropped on a fire site with a high probability.

Further, the gel-like fire extinguishing agent is formed only within the bag body 2, and, thus, the gel-like fire extinguishing agent is less likely to be adhered to the aerial fire extinguishing bucket 51, whereby the whole amount of the dropping-type fire extinguishing body 1 can be easily and completely discharged.

Further, depending upon the type (a rotary blade or a stationary blade) of an aircraft applied as an aerial fire extinguishing equipment, a dropping-type fire extinguishing body dropping apparatus that can maximally utilizes the structure can be newly designed, or alternatively, an existing fire extinguishing water dropping apparatus as such may be used for the dropping of the dropping-type fire extinguishing body.

For example, a belly tank mounted on the bottom of an aircraft that is utilized as a fire attacker as such can be used as long as, due to the size of the dropping-type fire extinguishing body, the dropping of the fire extinguishing body is restricted by the opening of the belly tank.

Further, in an embodiment of the present invention, since the gel-like fire extinguishing agent is filled into the inside of the bag body, a dropping point of the dropping-type fire extinguishing body 1 can easily be predicted with a high accuracy from the surface area and weight of the dropping-type fire extinguishing body 1 (bag body 2) and the height of dropping position.

Specifically, the dropping-type fire extinguishing body can be dropped while predicting a position of dropping of the dropping-type fire extinguishing body on a fire site with a high accuracy by calculating an optimal dropping point with dropping properties of the dropping-type fire extinguishing body 1 being added from information on wind direction and speed and information on fire position of a fire site, information on position, altitude, course, and speed of the aircraft and information on the weight and shape of the dropping-type fire extinguishing body 1.

REFERENCE SIGNS LIST

1: Dropping-type fire extinguishing body
2: Bag body
3: Gelling agent
4: Helicopter
5: Door
6: Dropping-type fire extinguishing body dropping apparatus
7: Fire extinguishing agent storage box
8: Bottom plate
9: Top plate
10: First locking unit
11: Lock bolt
12: Locking plate
13: Lock nut
14: Second locking unit
15: Lock bolt
16: Locking plate
17: Lock nut
19: Water supply pipe
20: Opening/closing valve
25: Stay
26: Guide roller
27: Guide rail
28: Stopper
30: Counter weight
31: Water tank
40: Partition wall
41: Hinge
42: Third locking unit
51: Aerial fire extinguishing bucket
52: Bottom dropping apparatus
53: Electric lock
54: Rubber packing

The invention claimed is:

1. A dropping-type fire extinguishing body to be dropped on a fire site for extinguishing the fire, wherein the dropping-type fire extinguishing body comprises a bag body formed of a water-permeable material which stores a gel-like fire extinguishing agent, and the gel-like fire extinguishing agent is formed by allowing water to be permeated into the bag body and to be absorbed in a gelling agent stored therein, whereby the inside of the bag body is filled with the gel-like fire extinguishing agent, and wherein the bag body is formed of a low impact-resistant material.

2. The dropping-type fire extinguishing body according to claim 1, wherein the bag body is formed of a material that is easily melted by heat.

3. The dropping-type fire extinguishing body according to claim 1, wherein the bag body further contains surfactant agent.

4. The dropping-type fire extinguishing body according to claim 1, wherein the bag body, when filled with the gel-like fire extinguishing agent through permeation of water, has an outer shape of a triangular pyramid shape or a spherical shape or a cubic shape.

5. The dropping-type fire extinguishing body according to claim 1, wherein the gelling agent is an edible gelling agent selected from gelatin, carrageenan, agar, and polysaccharides.

6. A gelling agent-storage bag body for the manufacture of a dropping-type fire extinguishing body according to claim 1, the gelling agent-storage bag body comprising:
the gelling agent; and
the bag body formed of the water-permeable material and containing the gelling agent.

7. A dropping-type fire extinguishing body dropping apparatus, the apparatus comprising:
a gelling agent storage body according to claim 6 loaded thereon,
wherein the apparatus is configured to be brought into a position above a fire site and is configured to allow the dropping-type fire extinguishing body to be dropped on the fire site.

8. An aircraft loaded with a dropping-type fire extinguishing body dropping apparatus according to claim 7.

9. A dropping-type fire extinguishing body dropping apparatus, the apparatus comprising:
a dropping-type fire extinguishing body according to claim 1 loaded thereon, wherein the apparatus is configured to be brought into a position above a fire site and is configure to allow the dropping-type fire extinguishing body to be dropped on the fire site.

10. An aircraft loaded with a dropping-type fire extinguishing body dropping apparatus according to claim 9.

11. A fire extinguishing method comprising:
using an aircraft according to claim 10;
mixing the gelling agent with water within the aircraft during movement to a fire site to form the dropping-type fire extinguishing body;
loading the dropping-type fire extinguishing body on the dropping-type fire extinguishing body dropping apparatus; and
when the aircraft arrives at a position above the fire site, dropping the dropping-type fire extinguishing body on a fire by the dropping-type fire extinguishing body dropping apparatus.

12. The fire extinguishing method according to claim 11, wherein the dropping-type fire extinguishing body is dropped while predicting an optimal position for dropping of the dropping-type fire extinguishing body to a fire site with a high accuracy by acquiring data on the shape and weight of the dropping-type fire extinguishing body, information on wind direction and speed and information on fire position of a fire site, information on position, altitude, course, and speed of the aircraft and calculating an optimal dropping position of the dropping-type fire extinguishing body.

13. A fire extinguishing method comprising:
using an aircraft according to claim 10;
loading a dropping-type fire extinguishing body dropping apparatus on which the dropping-type fire extinguishing body has been preloaded, on the aircraft when the aircraft flies to a fire site; and
when the aircraft arrives at a position above the fire site, dropping the dropping-type fire extinguishing body on a fire site by the dropping-type fire extinguishing body dropping apparatus.

14. The fire extinguishing method according to claim 13, wherein the dropping-type fire extinguishing body is dropped while predicting an optimal position for dropping of the dropping-type fire extinguishing body to a fire site with a high accuracy by acquiring data on the shape and weight of the dropping-type fire extinguishing body, information on wind direction and speed and information on fire position of a fire site, information on position, altitude, course, and speed of the aircraft and calculating an optimal dropping position of the dropping-type fire extinguishing body.

15. A method for manufacturing a dropping-type fire extinguishing body, the method comprising:
providing a bag body formed of a water-permeable material and a low impact-resistant material, the bag body containing a gelling agent; and
allowing water to permeate into the bag body and to be mixed with the gelling agent to prepare a gel-like fire extinguishing agent, thereby filling the gel-like fire extinguishing agent into the bag body.

16. A dropping-type fire extinguishing body to be dropped on a fire site for extinguishing the fire, wherein the dropping-type fire extinguishing body comprises a bag body formed of a water-permeable material which stores a gel-like fire extinguishing agent, and the gel-like fire extinguishing agent is formed by allowing water to be permeated into the bag body and to be absorbed in a gelling agent stored therein, whereby the inside of the bag body is filled with the gel-like fire extinguishing agent, and wherein the bag body has a low impact-resistant joined portion.

17. A dropping-type fire extinguishing body to be dropped on a fire site for extinguishing the fire, wherein the dropping-type fire extinguishing body comprises a bag body formed of a material that is water-permeable and which stores a gel-like fire extinguishing agent, and the gel-like fire extinguishing agent is formed by allowing water to be permeated into the bag body and to be absorbed in a gelling agent stored therein, whereby the inside of the bag body is filled with the gel-like fire extinguishing agent, and wherein the material of the bag body contains polylactic acid.

18. The dropping-type fire extinguishing body according to claim 17, wherein the content of the polylactic acid is not less than 80% by mass.

19. The dropping-type fire extinguishing body according to claim 17, wherein the basis weight of the polylactic acid is 10 to 30 $g/m^2$.

* * * * *